April 7, 1970 W. H. CLINGMAN, JR., ET AL 3,505,464

LINE SEQUENTIAL COLOR TELEVISION RECEIVER

Filed Dec. 12, 1966 4 Sheets-Sheet 2

April 7, 1970 W. H. CLINGMAN, JR., ET AL 3,505,464

LINE SEQUENTIAL COLOR TELEVISION RECEIVER

Filed Dec. 12, 1966 4 Sheets-Sheet 4

United States Patent Office 3,505,464

Patented Apr. 7, 1970

3,505,464

LINE SEQUENTIAL COLOR TELEVISION RECEIVER

William H. Clingman, Jr., Dallas, and George E. Goode, Richardson, Tex., assignors to Texas Instruments Incorporated, Dallas, Tex., a corporation of Delaware Filed Dec. 12, 1966, Ser. No. 600,999
Int. Cl. H04n 9/36
U.S. Cl. 178—5.4 8 Claims

ABSTRACT OF THE DISCLOSURE

A line sequential color television receiver which includes a phosphor screen to selectively emit light of different colors when excited by electron beams and at least two electron guns for emitting beams of electrons aimed to impinge upon and excite the screen at points which are slightly displaced from one another. The beams are repetitively swept together across the screen and the light emitted by the screen is changed on succession line sweeps. The beam of electrons emitted from one of the guns is modulated in accordance with respective ones of the records on successive line sweeps, simultaneously, the beam of the other gun is modulated in accordance with related information.

This invention relates to a color display system and more particularly to a line sequential kinescope color display system.

Line sequential color displays known heretofore typically operate by scanning a single line of a first color and then a single line of a second color, etc., so that the number of lines of each color is only equal to the number of scans divided by the number of colors employed. The relatively small number of lines of each component color thus caused the composite multicolor image to have an objectionable lined quality. Further, in using such displays in image transmission systems in which signals representing each of the component colors are provided to the display system continuously, the information representing the colors not being displayed at any given instant is lost and not utilized. Thus the color resolution of the display is not equal to or did not utilize fully the capability of the information transmission system.

SUMMARY OF THE INVENTION

Among the several objects of the present invention may be noted the provision of a line sequential color kinescope display system in which the number of lines of each color is substantially equal to the number of scans; the provision of such a system in which the image produced does not have an objectionable lined quality; the provision of such a display system which uses the image information provided to it relatively efficiently to produce an image of improved color resolution; the provision of such system which is reliable; and the provision of such a system which is relatively simple and inexpensive. Other objects and features will be in part apparent and in part pointed out hereinafter.

Briefly, a color display system according to the present invention provides a display in a plurality of different colors in response to respective color records. The system includes a phosphor screen which selectively emits light of different colors when excited by impinging electron beams. At least two electron guns emit respective beams of electrons aimed to impinge upon and excite the screen at respective points, which points are slightly displaced from one another in one direction along the screen. The beams are repetitively swept together across the screen to form respective, interlaced sets of spaced raster lines extending transversely to the direction in which the beams are displaced from one another along the screen. The color of the light emitted by the screen is changed on successive line sweeps. The beam of electrons emitted from one of the guns is modulated in accordance with respective ones of the records on successive line sweeps thereby to display all or a portion of the records. Simultaneously, the beam of electrons emitted from the other of the guns is modulated in accordance with the signals derived from and/or related to a record or portion thereof, displayed by the one gun whereby the lines of each component color displayed by the one gun are effectively broadened or filled in by lines of the same color representing related information.

BRIEF DESCRIPTION OF THE DRAWINGS

Corresponding reference characters indicate corresponding parts throughout the several views of the drawings.

DESCRIPTION OF PREFERRED EMBODIMENTS

Figures 1, 1A:
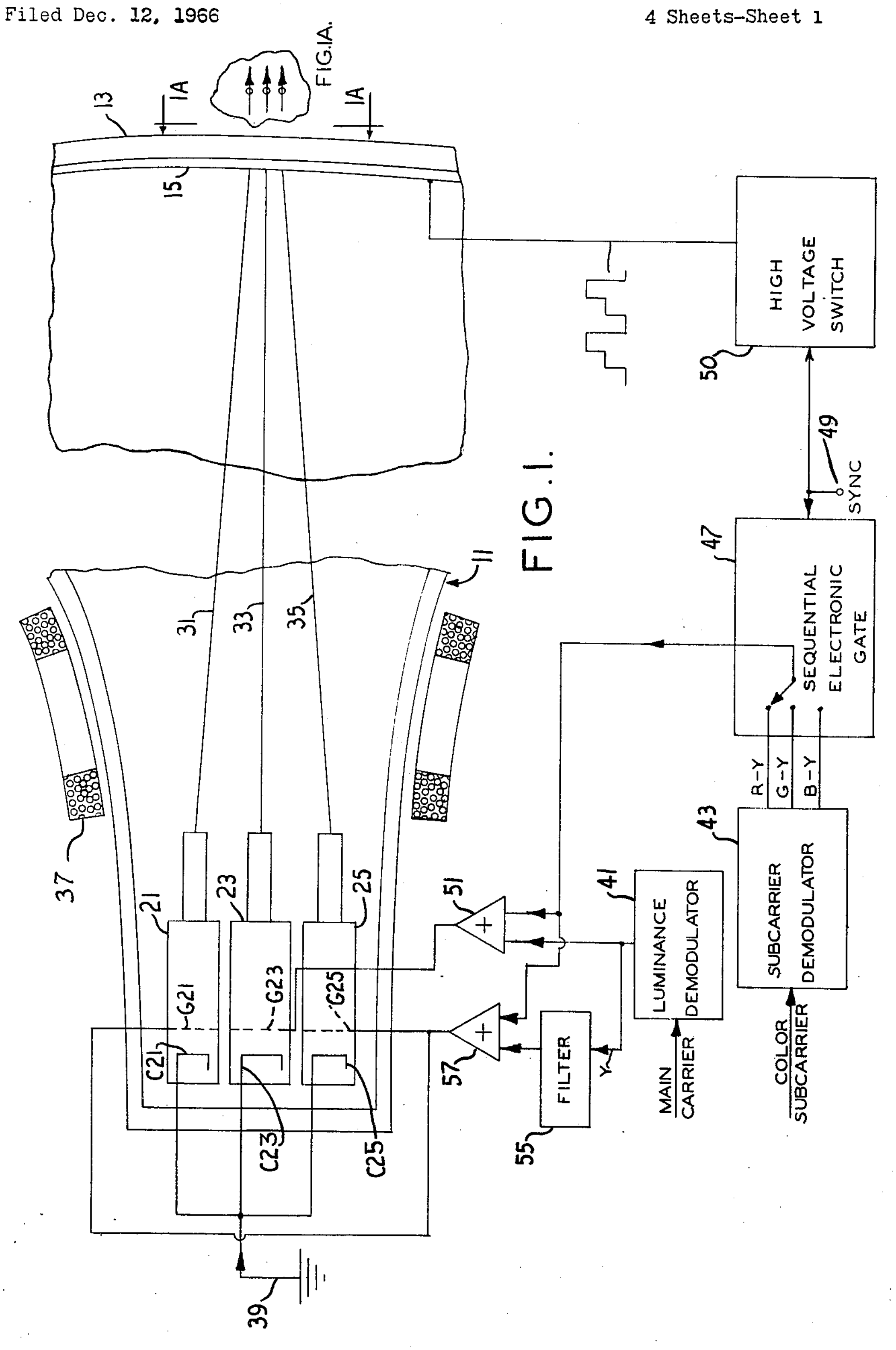
FIGURE 1 is a partially diagrammatic illustration of a color display system of this invention employing a kinescope having three electron guns.
FIGURE 1A is a fragmentary view of the face plate of the kinescope of FIGURE 1 taken on the line 1A—1A.

Referring now to FIGURE 1, there is indicated generally at 11 a color kinescope as employed in the present invention. Kinescope 11 includes a glass face plate 13 on the interior surface of which is deposited a phosphor screen 15. Phosphor screen 15 is preferably of the type generally disclosed in copending application Ser. No. 450,705, filed Apr. 26, 1965, comprising a mixture of various phosphors which emits light of different colors in response to impinging electrons of different energies. The color of the light emitted by such a screen may be selectively controlled by varying the energy or accelerating voltage applied to electrons which excite the phosphors.

Kinescope 11 also includes three electron guns as represented diagramatically at 21, 23 and 25, these guns being considered hereinafter as the upper gun, the middle gun and the lower gun respectively. Each of the guns 21, 23 and 25 includes a respective electron emissive cathode C21, C23 and C25 and a respective grid G21, G23 and G25 for modulating the beam current or number of electrons emitted from the gun as an electron beam. The cathodes are grounded as indicated at 39. Guns 21, 23 and 25 emit respective electron beams 31, 33 and 35 and are aimed so that the beams strike screen 15 at respective points which are slightly displaced from one another along the screen in the vertical direction. (See FIGURE 1A.) A magnetic deflection yoke 37 is provided for sweeping the beams 31, 33 and 35 together across screen 15 under the control of conventional horizontal and vertical sweep circuitry (not shown) to form respective sets of spaced horizontal raster lines as indicated in FIGURE 1A. The horizontal raster lines thus extend transversely to the vertical direction in which the different beams are displaced from one another. Guns 21, 23 and 25 are physically positioned close to one another so that there is only a slight deviation from parallelism between the beams 31, 33 and 35. Thus, when these beams are simultaneously scanned by yoke 37, they form respective sets of raster lines, which are in substantial registration, the lines formed by the scanning of each of the beams forming a successive subset of raster lines with the lines formed by the other beams.

The system illustrated in FIGURE 1 is arranged for displaying video information transmitted according to the NTSC system which is standard in this country. For this purpose, the system includes a luminance demodulator 41 for obtaining the conventional luminance or Y signal. The system also includes a synchronous color subcarrier demodulator 43 for obtaining the conventional $R-Y$, $G-Y$ and $B-Y$ chrominance signals. The chrominance signals are applied to a sequential electronic gate 47 which is operative to pass a selected one of these three signals. Gate 47 is operated under control of a conventionally derived horizontal synchronization signal, applied at a terminal 49, to pass the three chrominance signals in sequence on successive horizontal line scans of the beams 31, 33 and 35.

A high voltage switch 50 is operated in synchronism with gate 47 to apply different electron accelerating voltages to screen 15 on successive line sweeps so that, as each chrominance signal is passed by gate 47, the light emitted by screen 15 is of a color appropriate for the display of the original color record corresponding to that chrominance signal.

The luminance or Y signal and the selected one of the chrominance signals are combined in a summing matrix 51 to obtain a signal which comprises a record of the respective color component of the image or scene being transmitted by the NTSC system. This signal is applied to the grid G23 of the middle electron gun 23 to modulate the beam of electrons emitted from that gun thereby to display the record in screen 15.

The luminance or Y signal is also applied to a filter 55 which removes the high frequency components of this signal, thereby reducing its bandwidth. As is understood by those skilled in the art, the chrominance signals in the NTSC system are already of relatively low bandwidth as compared with the unfiltered luminance signal. This luminance signal of reduced bandwith and the chrominance signal passed by gate 47 are combined in a summing network 57 and the resulting signal is applied to the grids G21 and G25 of the electron guns 21 and 25. In one sense, the signal thus applied to grids G21 and G25 is a color record signal of relatively low bandwidth or resolution.

On any given sweep of the beams 31, 33 and 35, the electron accelerating voltage applied to screen 15 is the same for all three beams and thus the electrons from all three guns produce light of the same color. The scanning of the beam 33 thus produces a line of relatively high resolution in the one color, while the beams 31 and 35 produce lines of the same color as the beam 33 line and adjacent thereto but of lower resolution. On successive line sweeps the color of the light emitted by screen 15 is changed in correspondence with the color signals being applied to the guns 21, 23 and 25 so that the color signals are displayed in light of appropriate color.

Figure 2:
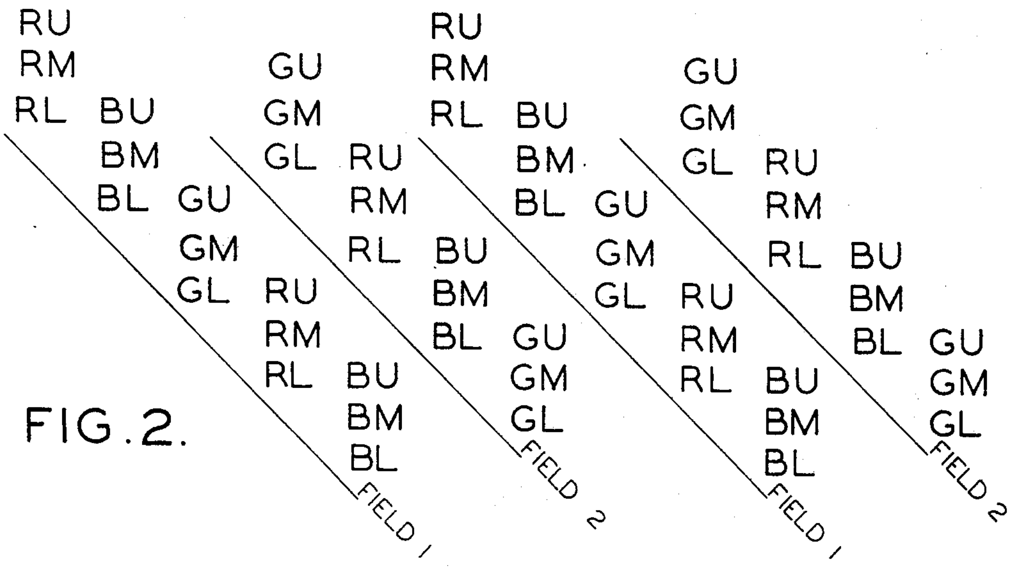
FIGURE 2 is a chart representing the scanning patterns of the three electron guns of FIGURE 1.

The vertical spacing between the points of impingement of the beams 31, 33 and 35 on screen 15 is preferably adjusted in relation to the separation between successively scanned lines so that the line formed by the upper gun during each scan falls on top of the line formed by the lower gun on the previous sweep. The effect of this scanning pattern is illustrated in FIGURE 2 in which each line formed by one of the beams is represented by a pair of letters, the first letter being indicative of the color of that line, e.g., R for red, B for blue and G for green, with the second letter being indicative of the gun which produced that line, e.g., U for upper, M for middle, and L for lower. Thus, as illustrated, the first scan produces three red lines RU, RM and RL. The second scan produces three blue lines BU, BM and BL, the line BU falling vertically on top of the line RL. A third scan produces three green lines, GU, GM and GL, the first of which (GU) falls on top of the last line (BL) of the preceding scan. This sequence repeats until a full field has been scanned.

When the first field is finished, the second field is scanned starting with three green lines GU, GM and GL. Since the second field in the NTSC system of image transmission is interlaced or staggered in vertical position with respect to the first field, the first green line GU falls on top of the second red line RM of the preceding field. The second field is scanned in the same color sequence as the first field, again with the top line of each three lines of the same color falling on the bottom line of the lines in the preceding color. Thus, it is seen, for example, that any middle beam line of the first field is scanned by lower and upper beams in the succeeding field which provides a full color complement (e.g., red, blue, green) for that line. When the second field is finished, the scanning and color signal switching sequence repeats so that the next field contains lines of the same color in the same vertical positions as the first field.

From FIGURE 2 it can be seen that, for each pair of fields, there is a red line, a blue line and a green line indicated on each horizontal line of the chart, except for the first and last lines of each frame, and that the number of lines of each color is thus substantially equal to the number of scans when considered over a pair of fields. Further, since the production of light of each color is distributed substantially uniformly in the vertical direction, the display does not have an objectionable lined appearance. It will be understood by those skilled in the art, however, that the color resolution in the vertical direction will not be equal to the luminance or monochrome resolution since the upper and lower of each triplet of lines of color are of lower resolution than the middle line. In one sense, this loss of vertical resolution is a necessary consequence of having utilized at any given instant only one of the three chrominance signals ($R-Y$, $G-Y$ and $B-Y$) which were available.

Figure 3:
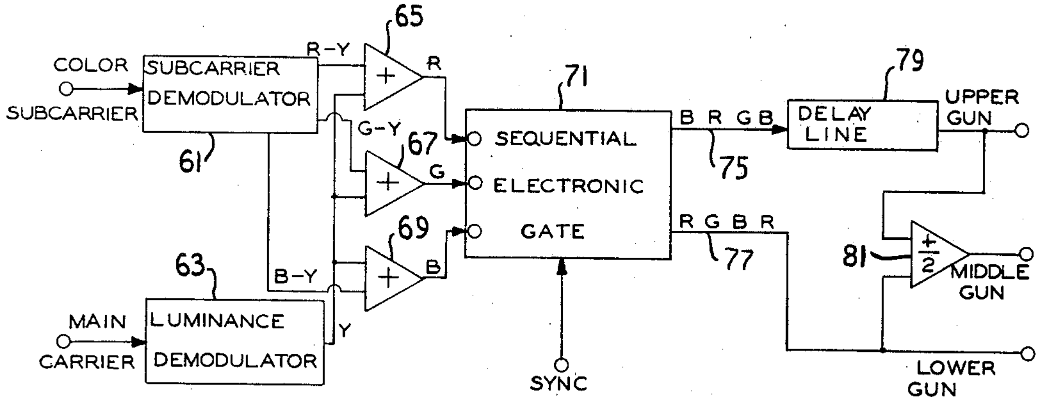
FIGURE 3 is a diagrammatic illustration of a modification of the color display system of this invention in which video information is stored in a delay line.

In the embodiment of FIGURE 3, more of the available color information is utilized with a corresponding improvement in the vertical color resolution. In this embodiment, the color subcarrier is demodulated as indicated at 61 to provide the chrominance signals $R-Y$, $G-Y$ and $B-Y$ and the luminance carrier is detected as indicated at 63 to provide the luminance or Y signal. The luminance signal is combined with each of the chrominance signals in a respective summing network 65, 67 and 69, respectively, to obtain R, G and B color signals which comprise component color records of a scene to be displayed. These color signals are applied to a sequential electronic gate 71 which sequentially passes selected ones of the color signals to provide a pair of sequential signals at leads 75 and 77. Each of the sequential signals represents a different color during each successive line-scan interval. The various color signals are applied to leads 75 and 77 in the same order but with different timing so that there is a one-line phase displacement between the sequence of signals as indicated by RGB characters shown in the drawing adjacent each of these lines. The signal at lead 75 is applied to a delay line 79 which introduces a delay in this signal equal to one line sweep period. The signal provided at the output of the delay line thus contains information representing the same color as that carried by the lead 77 but taken from the preceding line.

The signal taken from delay line 79 is applied to the upper gun of a tube such as illustrated in FIGURE 1, whereas the undelayed signal at line 77 is applied to the lower gun. Each of these signals is also applied to an averaging circuit 81 which provides a signal which is the average of the delayed and undelayed signals. This averaged signal is applied to the middle gun. The electron beams emitted from the three guns are scanned as in the embodiment of FIGURE 1.

Considering again FIGURE 2, it can be seen that the upper line of each triplet of lines of the same color represents the delayed color information taken from a preceding line, the bottom line represents the color information currently being received, and the middle represents information which is the average of these two signals. The resultant display thus includes one line of each color for each sweep with two out of every three lines representing full bandwidth informaiton as received without filtering or averaging. Accordingly this display has improved vertical resolution as compared with the display provided by the embodiment illustrated in FIGURE 1.

Figure 4:
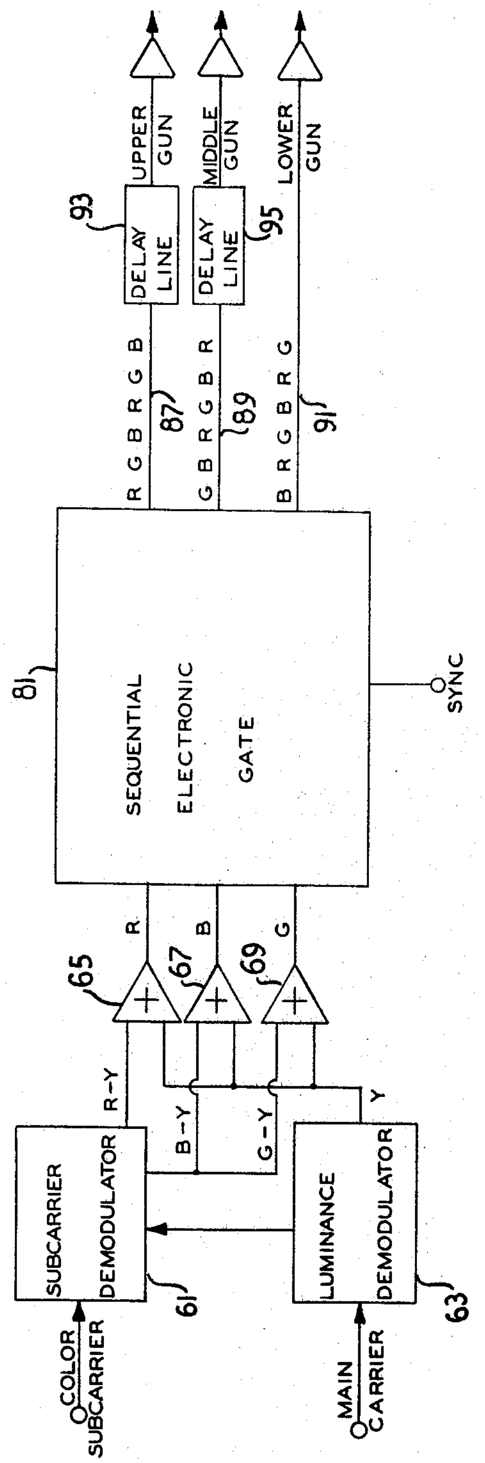
FIGURE 4 is a further modification employing multiple delay lines.

In the embodiment of FIGURE 4, still further improved vertical color resolution is obtained by utilizing all of the color information available. In this embodiment the three color signals R, G and B, derived as in the embodiment of FIGURE 3, are applied to sequential electronic gate 81 which switches these signals so that the three color signals are applied to three output leads 87, 89 and 91 in alternation, each of the colors being applied to each of the different output lines during a different time interval so that for any one color signal there is a time displacement equal to one line sweep period between output leads 87 and 89 and one line sweep period between output leads 89 and 91.

The signal on lead 87 is applied to a delay line 93 which provides a period of delay equal to two line sweep periods, while the signal on lead 89 is applied to a delay line 95 providing a delay in the signal equal to one line sweep period. The signals at the outputs of the delay lines 93 and 95 will thus, at any given instant, contain information representing the same component color as that information carried by the lead 91 but derived from the second and first preceding lines in the raster respectively.

Figure 5:
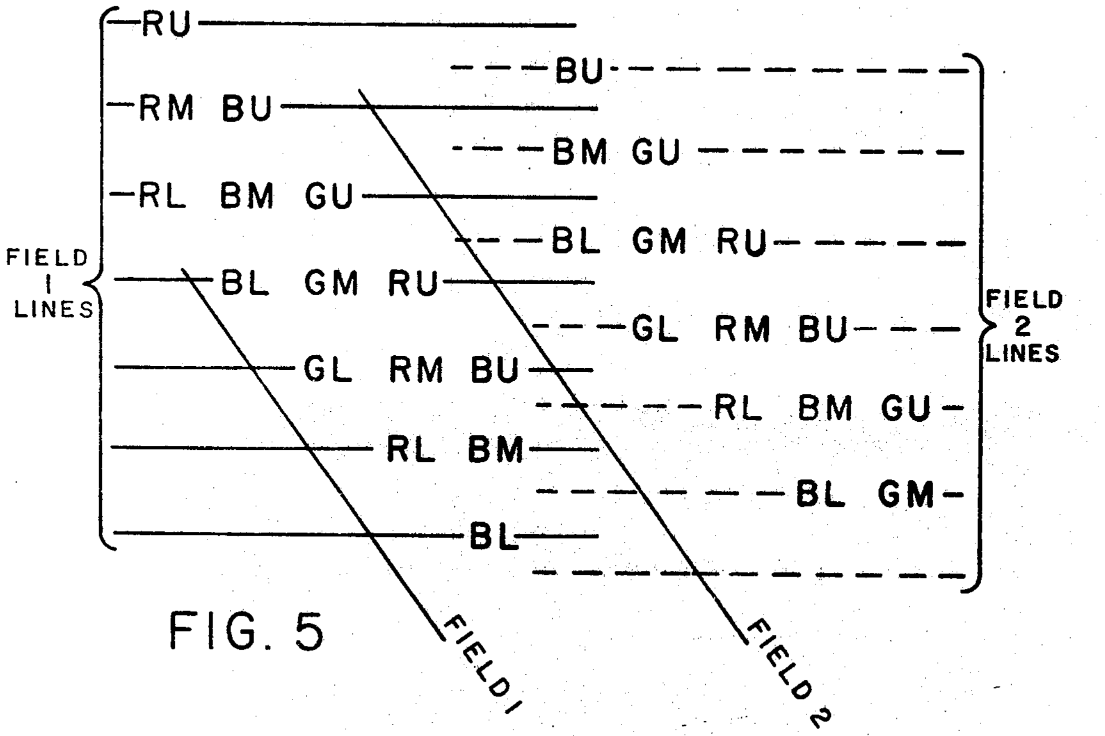
FIGURE 5 is a chart representing the scanning pattern in which each line is scanned three times, once by each gun.

The output signal from delay line 93 is applied to the upper gun; the output signal from delay line 95 is applied to the middle gun; and the signal carried by line 91 is applied to the lower gun of a kinescope such as that illustrated in FIGURE 1. The beams emitted by these guns are swept in a manner similar to that described with reference to FIGURE 1 except that each line is scanned three times, once by each gun, in the same field as shown in FIGURE 5 and such that the lines of one field do not over lap lines in the other field. From a consideration of the circuit of FIGURE 4 and the information utilized by that circuit it can be seen that each such line represents a respective scan line in the original scene transmitted according to the NTSC system. This system thus utilizes essentially all of the color information available and provides exceptionally high color resolution.

In view of the above, it will be seen that the several objects of the invention are achieved and other advantageous results attained.

Various changes could be made in the above constructions without departing from the scope of the invention. For example, the preferred embodiments have been described as including a phosphor sceen of the penatron type whereas the invention can be used in conjunction with a beam indexing color display system. It is intended that all matter contained in the above description or shown in the accompanying drawings shall be interpreted as illustrative and not in a limiting sense.

What is claimed is:

1. A color display system for providing a display in a plurality of colors in response to respective color records, said system comprising:

a phosphor screen which selectively emits light of different colors when excited by impinging electron beams;

at least two electron guns for emitting respective beams of electrons aimed to impinge upon and excite said screen at respective points which are slightly displaced from one another in one direction along said screen;

deflection means for repetitively sweeping both of said beams together across said screen to form respective sets of spaced raster lines which extend transversely to said one direction, the lines formed by the scanning of one beam being interlaced with the lines formed by the other beam;

switching means for changing on successive line sweeps the color of the light emitted by said screen in response to said beams;

modulating means including an electronic sequential switch for modulating the beam of electrons emitted from one of said guns in accordance with respective ones of said records on successive line sweeps thereby to display said records in their respective colors and including circuits for simultaneously modulating the beam of electrons emitted from the other one of said guns in accordance with a signal derived from and related to the record then being displayed by said one gun whereby the lines of each component color displayed by said one gun are filled in by lines of the same color representing related information.

2. A color display system as set forth in Claim 1 in which the signal applied to the other one of said guns is obtained by filtering a signal which is applied to said one gun to remove high frequency video components whereby the lines displayed by said other gun are of lower resolution than the lines displayed by said one gun.

3. A color display system as set forth in claim 2 including a third gun, the electron beam emitted from said third gun also being modulated in accordance with the filtered signal.

4. A color display system as set forth in claim 1 in which said screen comprises phosphors which emit light of different colors when energized by electrons of different energies.

5. A color display system as set forth in claim 4 in which said switching means for changing the color of the light emitted by said screen includes means for applying different electron accelerating voltages to said screen on different line sweeps.

6. A color display system for providing a display in a plurality of colors in response to respective color records, said system comprising:

a phosphor screen which selectively emits light of different colors when excited by impinging electron beams;

at least two electron guns for emitting respective beams of electrons aimed to impinge upon and excite said screen at respective points which are slightly displaced from one another in one direction along said screen;

means for repetitively sweeping both of said beams together across said screen to form respective sets of spaced raster lines which extend transversely to said one direction, the lines formed by the scanning of one beam being interlaced with the lines formed by the other beam;

gate means for providing from said records a pair of control signals each of which represents different ones of said records during succesive line sweep periods, the two control signals representing different records at any given instant;

means for delaying one of said control signals by at least one line sweep period so that the other control signal and the delayed control signal represent different portions of the same record at any given instant;

means for modulating the beam of electrons emitted from one of said guns in accordance with said delayed signal and for modulating the beam of electrons emitted from the other one of said guns in accordance with said other control signal; and means for changing on successive line sweeps the color of the light emitted by said screen in response to said beams whereby said records are displayed in respective colors two lines at a time.

7. A color display system as set forth in claim 6 including a third gun and including also means for modulating the beam of electrons emitted by said third gun in accordance with a signal which comprises an average of said delayed signal and said other control signal.

8. A color display system for providing a display in three colors in response to respective color records, said system comprising:

a phosphor screen which selectively emits light of three different colors when excited by impinging electron beams;

three electron guns for emitting respective beams of electrons aimed to impinge upon and excite said screen at respective points which are slightly displaced from one another in one direction along said screen;

means for repetitively sweeping said beams together across said screen to form respective sets of spaced raster lines which extend transversely to said one direction, the lines formed by the scanning of said beams being interlaced with one another;

gate means for providing from said records three control signals each of which represents different ones of said records during successive line sweep periods, the different control signals representing different records at any given instant;

means for delaying one of said control signals by one line sweep period and another of said control signals by two line sweep periods so that the remaining control signal and the delayed control signals represent different portions of the same record at any given instant;

means for modulating the beams of electrons emitted from said guns in accordance with said delayed signals and said remaining control signal respectively; and means for changing on successive line sweeps the color of the light emitted by said screen in response to said beams whereby said records are displayed in respective colors three lines at a time.

References Cited

UNITED STATES PATENTS

| | | | |
|---|---|---|---|
| 3,098,170 | 7/1963 | Rhodes | 178—5.4 |
| 3,204,143 | 8/1965 | Pritchard | 178—5.2 |
| 3,272,914 | 9/1966 | Moles et al. | |

ROBERT L. GRIFFIN, Primary Examiner

R. P. LANGE, Assistant Examiner